United States Patent [19]

Sato

[11] Patent Number: 4,513,369
[45] Date of Patent: Apr. 23, 1985

[54] INFORMATION PROCESSING SYSTEM

[75] Inventor: Fumitaka Sato, Oume, Japan

[73] Assignee: Tokyo Shibaura Denki Kabushiki Kaisha, Kawasaki, Japan

[21] Appl. No.: 349,698

[22] Filed: Feb. 17, 1982

[30] Foreign Application Priority Data

Feb. 20, 1981 [JP] Japan .................................. 56-23166

[51] Int. Cl.³ .............................................. G06F 9/00
[52] U.S. Cl. ................................................ 364/200
[58] Field of Search ... 364/200 MS File, 900 MS File

[56] References Cited

U.S. PATENT DOCUMENTS 4,057,848  11/1977  Hayashi .............................. 364/200
4,101,960  7/1978   Stokes et al. ....................... 364/200

OTHER PUBLICATIONS

VAX11/780 Hardware Handbook, published by The Digital Equipment Corporation, 1978.

Primary Examiner—Gareth D. Shaw
Assistant Examiner—John G. Mills
Attorney, Agent, or Firm—Oblon, Fisher, Spivak, McClelland & Maier

[57] ABSTRACT

An information processing system using a virtual addressing for paging, including a main memory, a memory controller, a central processing unit for processing information and accessing the memory controller with a virtual address, an input/output controller for interfacing input/output devices with the memory controller and the central processing unit, a common bus for interconnecting the memory controller, the central processing unit and the input/output controller with each other. The memory controller includes a translator for translating the virtual address into a real address, whereby the virtual address is available for addressing the main memory after being translated into the real address.

5 Claims, 5 Drawing Figures

INFORMATION PROCESSING SYSTEM

BACKGROUND OF THE INVENTION

1. Field of the Invention

This invention relates to an information processing system and more particularly to an information processing system with a virtual addressing system capable of paging.

2. Description of the Prior Art

A virtual memory is used to make available for the user a larger amount of additional memory space than the actual capacity of a main memory. The user can write a program with a virtual address, however, the virtual address is usually transferred to a channel after it is translated into a real address at an input and output control portion of an operating system when it is input or output. Namely, in a computer system using the virtual memory, a central processing unit (CPU) typically has a hardware configuration including a so-called dynamic address translator (DAT) architecture to change the virtual memory space selected by the user into the real memory space. There are a few cases where the hardware architecture is applied even to the channel which controls the input and output operations. If the channel does not have the DAT, it is necessary for the operating system to convert a channel program written using virtual addressing to a channel program written using real addressing. If there is a branch command in the channel program, or if memory area in virtual address space for input and/or output data is more than a few pages, however, the translation operation will be very complicated. For simplifying the translation operation, there is an improved system which is designed to enable the use of an indirect address scheme at the channel. However, the disadvantage of this system is that the operating system has to trace the channel program and translate it into the real address, and the number of dynamic steps for the operating system would be too great.

FIG. 1 shows a block diagram of a prior art information processing system. In FIG. 1 there are shown the main memory 10, a main memory controller 11, a central processing unit (CPU) 12, and input/output controllers (IOC) 14 and 15. The CPU 12 and the IOC's 14 and 15 are respectively connected to the main memory controller (MMC) 11 through a common bus 17. The MMC is designed to access the main memory 10. In the system, the main memory 10 includes a plurality of main memory modules MM0, MM1, MM2 and MM3. The IOC 14 connects the magnetic disk apparatus MK and the other IOC 15 connects a card reader R and a line printer LP through an input and output bus to the MMC 11. The CPU 12 includes a dynamic address translator (DAT) 13. Therefore, the virtual address given by the program is translated by the DAT 13 and is sent to the main memory controller 11 through the common bus 17. The associative address given by the channel program is translated into the actual address by a method of software, and such real address as a part of the so-called input/output command is then transferred to the IOCs 4 and 15. In this address translation method, the CPU bears too many loads to operate the system efficiently. However, there is a system which improves upon the above disadvantages of the input and output channel as shown in FIG. 1, wherein the IOCs 14 and 15 also have a DAT. For example, the IBM 4341 processor is explained in the publication, "A guide to the IBM 4341 Processor (GC20-1877)" published by IBM corporation. However, the system still requires the double DAT architecture, one for the CPU and one for the IOC, so that the efficiency of the system is lower.

SUMMARY OF THE INVENTION

It is accordingly a principal object of the invention to provide an information processing system using a new and improved dynamic address translator to translate the virtual address into the real address in response to memory access by the central processing unit or the input/output controller.

It is another object of the invention to provide an information processing system using a new and improved dynamic address translator, commonly used by both the central processing unit and the input/output controller, which has address translation time periods sufficiently short to accommodate the necessity of high speed data transfer required to access memory on the side of the input and output controller.

In order to attain the above objects, the information processing system using a system of virtual addressing for paging includes a main memory controller, central processing unit, an input and output controller, a common bus which connects the main memory controller, the central processing unit an input/output controller, and a dynamic address translator in the main memory controller to translate a virtual address into a real address, the virtual address transferred through the common bus being available for addressing of the main memory after being translated into the real address.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
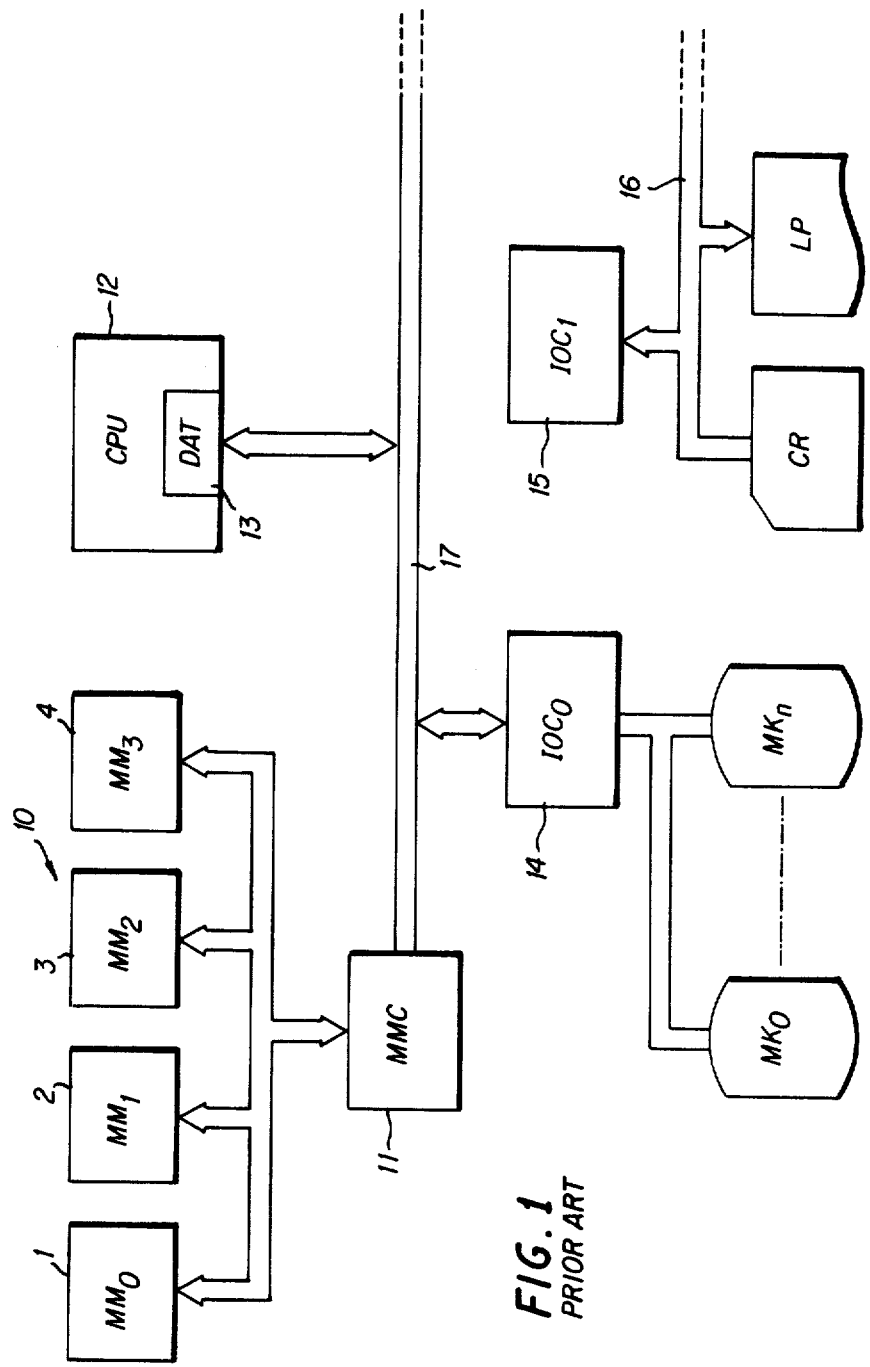
FIG. 1 is a block diagram of a prior art information processing system.
Figure 2:
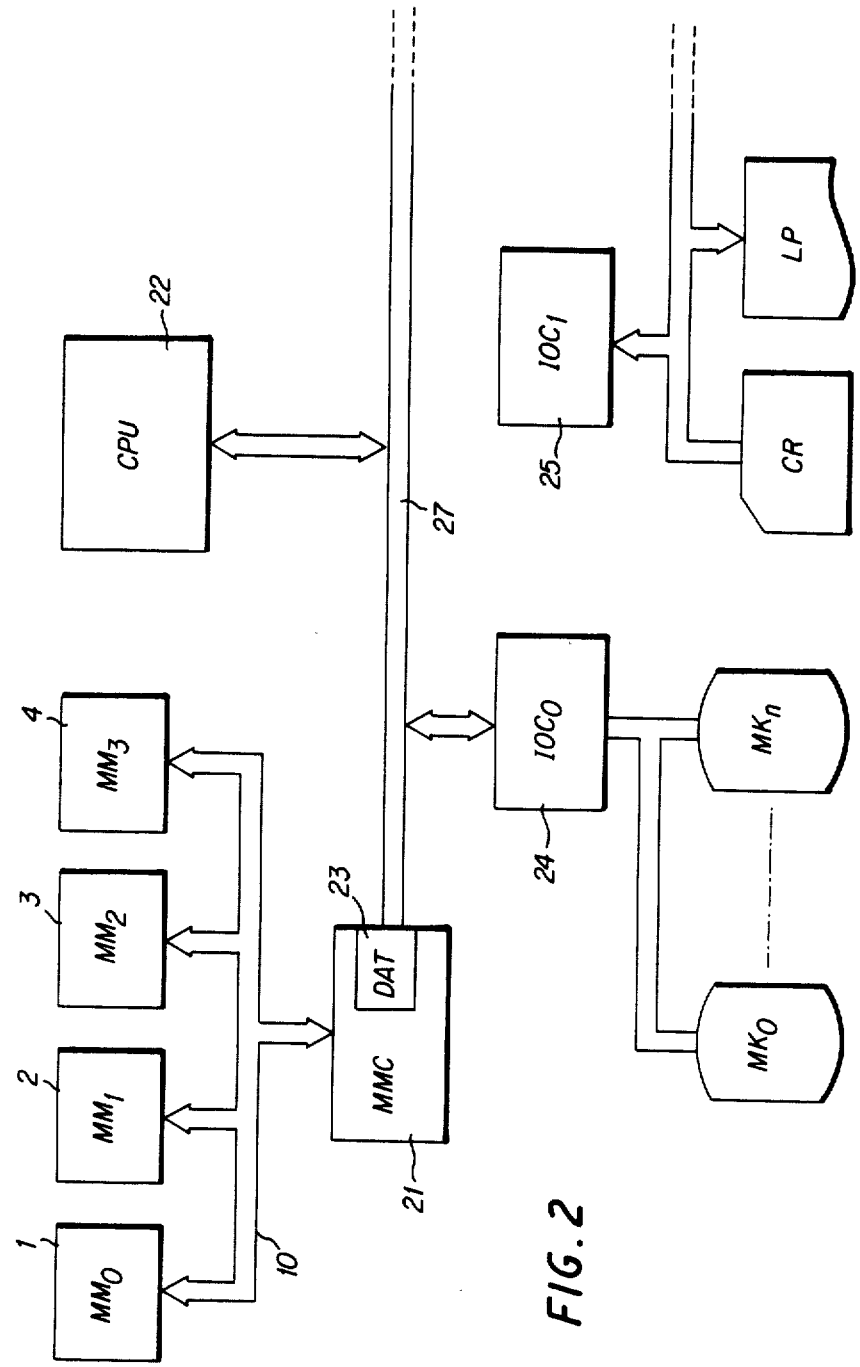
FIG. 2 is a block diagram of an embodiment of the present invention.

Referring now to the drawings, wherein like reference numerals designate identical or corresponding parts throughout the several views and more particularly to FIG. 2 thereof, a block diagram of one embodiment of the present invention is shown. The common bus 27 is a bus consisting of address lines, data lines and control lines similar to the common bus 17 shown in FIG. 1, except the number of address lines is increased to transfer the virtual address. In the prior art embodiment, for instance, the common bus 17 in FIG. 1 has twenty-four address lines in order to designate the real address for a maximum of sixteen megabytes (MB) ($16 \times 10^6$ byte). However, the common bus 27 in FIG. 2 is so changed as to have the thirty-two address lines to be able to designate the virtual address for a maximum of four gigabytes (GB) (=$4 \times 10^9$ byte). The CPU 22, without the DAT, sends the virtual address given by the user program to the common bus for accessing the main memory. The main memory controller 21 containing the DAT 23, translates the virtual address, provided by the common bus 27, into the real address. The main memory controller 21 accesses the main memory 10 with the real address. The IOC 24 and 25 receives the virtual address as a part of the channel command from CPU 22 when CPU 22 starts the direct memory access (DMA) operation of the IOC 24 or 25. When IOC 24 and 25 executes the channel command and accesses the main memory 10, the IOC 24 or 25 delivers virtual address to the main memory controller (MMC) 21. Therefore the format of the channel command itself requires the address registers in the IOC 24 and 25 to be expanded to deal with an address of 32 bits instead of an address of 24 bits as mentioned above. It is a simple matter of design to one skilled in the field of this technology on how to increase the number of bits of address to the common bus 27 and the IOC 24 and 25.

The DAT 23 is similar to the DAT 17 of the prior art in its basic architecture. Namely, the DAT 23 has a translation circuit to translate the desired virtual address into the corresponding real address in referring to an address translation table stored in the main memory (which herein refers to both the MMC 11 and the MMU 10), and further has an address translation buffer (TLB) to store an address translation pair, comprising the virtual address and the corresponding real address accessed recently in the translation circuit. This decreases the access time for the next memory access which also requires use of the same address translation pair. Although the translation circuit of the DAT 23 is similar to the translation circuit of the DAT 13, the DAT 13 loads a register representing the starting point of the address translation table with the microprogram of the CPU 12, while the DAT 23 loads the register with a special command.

Figure 3:
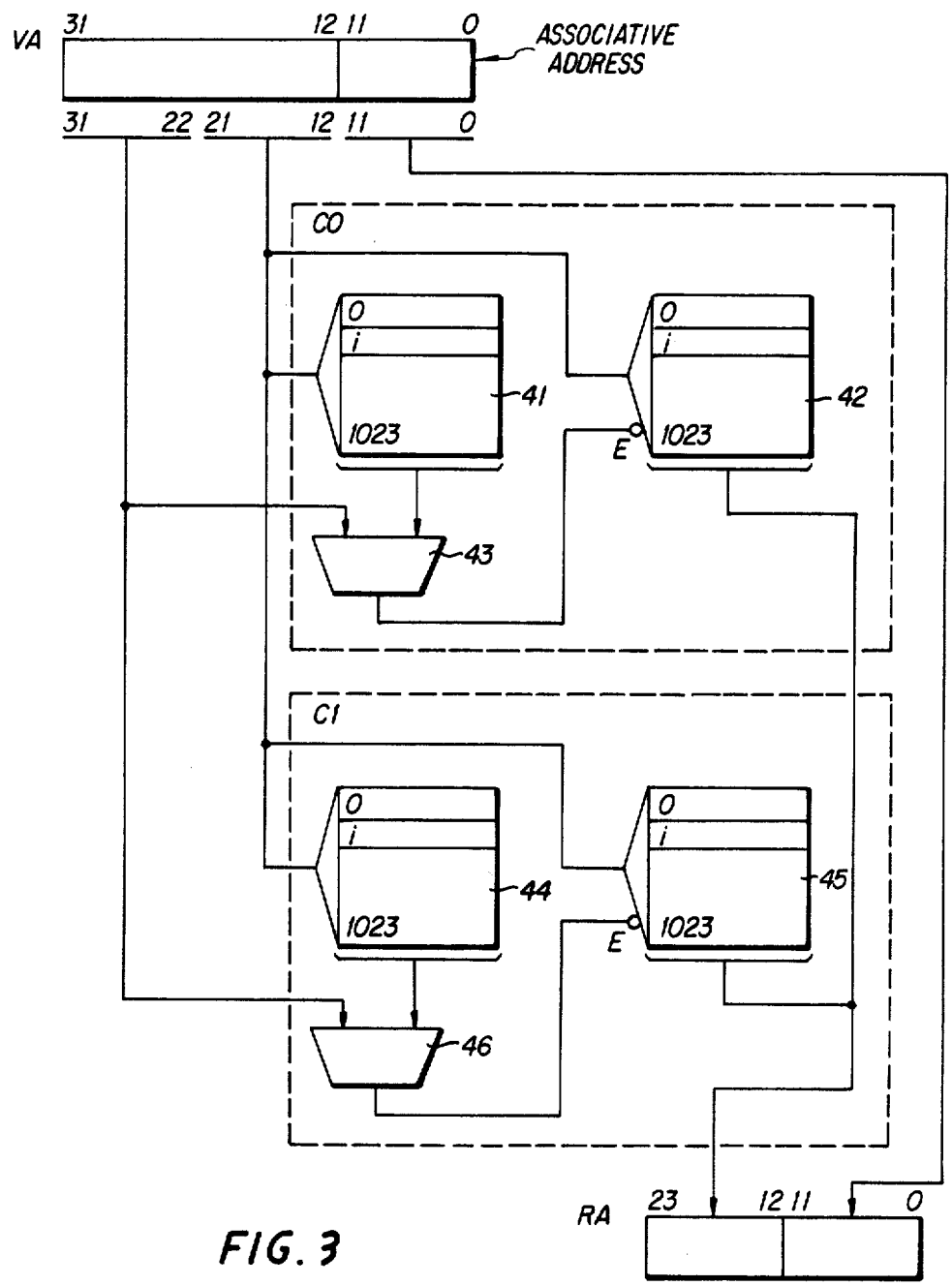
FIG. 3 is a block diagram of an address translation buffer in the dynamic address translator of the present invention.

FIG. 3 shows a block diagram of the address translation buffer (TLB) of the DAT 23. The TLB is formed as a set virtual memory, well known in the art. In this embodiment, the capacity of each memory 41, 42, 44 and 45 is 1024 words and each memory is accessed with the bits 21-12 of the virtual address (VA). The memories 41 and 44 store the bits 31-32 of the virtual address (VA) accessed by the address translation circuit, respectively. The memories 42 and 45 store the bits 23-12 of the corresponding real address of the virtual address (VA), respectively. The bits 31-22 of the virtual address (VA) are delivered to the comparators 43 and 46 so as to be compared with each of the outputs of the memory 41 and 44. The outputs of the comparator 43 and 46 are connected to the respective enable terminals (E) of the memory 42 and 45 and when the comparator 43 or 46 detects coincidence of their respective inputs, the access of corresponding memory 42 or 45 is permitted and data is read out of this memory 42 or 45 as the bits 23-12 of the real address. The first section of the memory 41 and 42 with the comparator 43 is called the zero compartment $C_0$ and the second section of the memory 44 and 45 with the comparator 46 is called the first compartment C. Since the structure and operation of the set virtual memory is well known, no further detailed explanation thereof is necessary.

Figure 4:
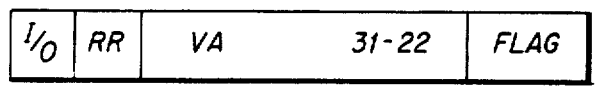
FIG. 4 is an illustration of the entry format of the main memory to which the address translation buffer is assigned.

FIG. 4 shows the format of one word (so-called "entry") out of the memory 41 or 44 of the address translation buffer (TLB). The bits 31-22 of the data stored in the entry are used to be compared with the bits 31-22 of the virtual address by the comparator 43 or 46 and the flag (FLAG) represents bits for various controls, for instance, if the entry is vacant still, and if into the entry corresponding to the page data as shown in FIG. 4 has been written. A round robin (recirculating) counter RR is used when the TLB stores a new entry from the address translation table. If the bits 21-12 of the virtual address of the entry are equal to the address "i", the RR bit determines whether the present contents of such entry addressed "i" as shown in FIG. 4 in either compartments $C_0$ or $C_1$ are dumped and replaced with the new address translation pair. The RR bit read from the entry at the address "i" of the zero compartment is used to search the TLB whether TLB can store the new address translation pair therein if the TLB doesn't store such address translation pair. The RR bit of the first compartment $C_1$ is not used. A role performed by the RR bit is determined by logic manipulation of a replacement algorithm. In the embodiment, the first-in-first-out method as the replacement algorithm is used and the round robin counter realizes the conversion algorithm for replacement.

The input/output (I/O) bit is also needed to perform the invention. The I/O bit guarantees the shortest time necessary for translating the virtual address to real address when the I/O controller 24 or 25 directly accesses the main memory for high speed data transfer. Namely, before starting the I/O device for high speed data transfer, the operating system sets the I/O flag of the entry in the TLB corresponding to the page for the data transfer. Then the contents of the entry in which the I/O flag is set are never replaced in the replacement algorithm explained above.

Figure 5:
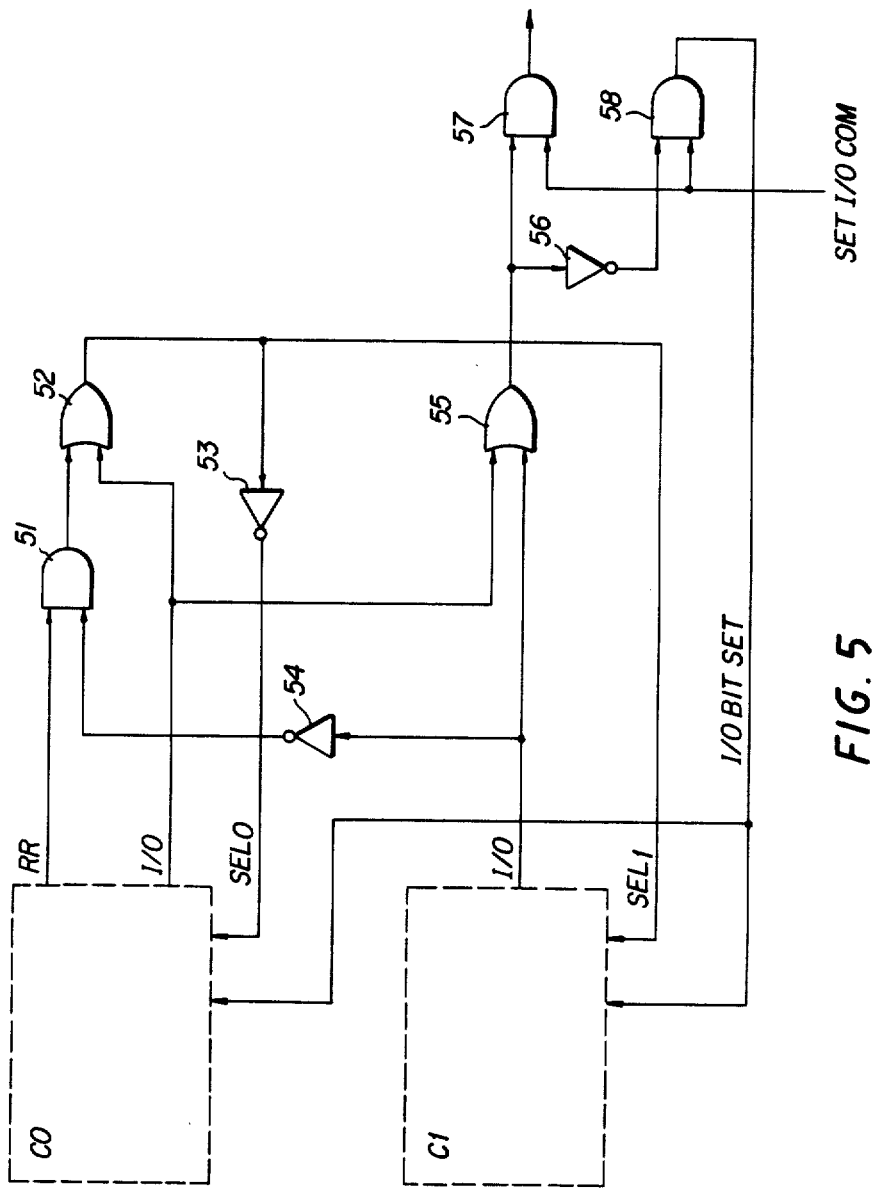
FIG. 5 is a circuit diagram of one embodiment of the present invention.

The operation will be mentioned in more detail hereinafter according to FIG. 5. The output of the I/O bit read from the first compartment $C_1$ is inverted by the inverter 54 and is AND'ed with the RR bit read from the zero compartment $C_0$ by an AND gate 51 to obtain the logical product. The output of the gate 51 is OR'ed with the I/O bit read from the zero compartment $C_0$ at the OR gate 52 to obtain the logical sum. The output of the OR gate 52 provides a select signal SEL for the first compartment $C_1$ and provides another select signal $SEL_0$ for the zero compartment $C_0$ after it is inverted by the inverter 53. The new data as shown in FIG. 4 will be stored in the entry at the address "i" of the compartment selected by the select signals $SEL_0$ or $SEL_1$. If the I/O bit in the entry of the zero compartment $C_0$ is set, the first compartment $C_1$ is selected by the output of the OR gate 52 no matter whether the RR bit is set or not. Therefore the contents of the entry in the zero compartment $C_0$ with the I/O bit set, remains in the TLB without being replaced. On the contrary, if the I/O bit in the entry of the first compartment $C_1$ is set, the zero compartment $C_0$ is selected by the output of the OR gate 52 through the inverter 53, as the output of the inverter 54 inhibits the RR bit at the AND gate 51. If in both entries of the compartments C0 and C1 at the same address "i", their I/O bits are set at, the TLB cannot store the new address translation pair corresponding to the page, when the CPU accesses another page corresponding to the address "i". Therefore, the I/O bits in both compartments can be never set by the method mentioned below. In reference to FIG. 5, the outputs of the I/O bits from their respective compartments C0 and C1 are lead to the OR gate 55 to obtain the logical sum. The output of the AND gate 55 and a set I/O command signal (SET I/O COM) are lead to the AND gate 57 to obtain a logical product. The output of the AND gate 57 is then led to an exception processing circuit (not shown). Now the set I/O command signal is explained by first referring to FIG. 2. The CPU 22 transfers a set I/O bit command to the main memory controller 21 to set an I/O bit in the entry according to the pages in the virtual address space for the data transfer before the CPU starts the DMA operation for the high speed data transfer. When the main memory controller 21 receives the set I/O bit command, it generates the set I/O command signal to FIG. 5.

If the bits 21–12 of the virtual address corresponding to the page is "i", the address "i" of the TLB is accessed, and the I/O bit in the entry is set by the I/O bit set command if the contents of the entry are corresponding to said page in the TLB. At that time, if the I/O bit of either compartments $C_0$ or $C_1$ is set, the output of the AND gate 57 changes state to a significant condition and activates the exception processing circuit. The exception processing circuit gives notice to the CPU 22 by interruption that the CPU 22 cannot start the high speed data transfer using the page. If the I/O bit set to "i" is not read out from either compartment, the output of the OR gate 55 becomes "0" and the output of the inverter 56 becomes "1". Therefore, the set I/O command signal (SET I/O COM) is sent to both the compartments $C_0$ and $C_1$ as the I/O set signal (I/O BIT SET) through the AND gate 58. The I/O bit set signal is AND'ed with the corresponding output of each of the comparator circuits 43 and 46 of FIG. 3. Therefore, the I/O bit in the entry, of which data stored in the bits 31 to 22 (shown in FIG. 4) coincides with the virtual address delivered (shown in FIG. 3), is set.

As explained above, the DAT 23 can always make the address translation in the shortest time, when the I/O device, for instance the IOC 24 in FIG. 2, achieves the direct memory access data transfer, because address translation pair used in memory access of the high speed data transfer is kept within the TLB of the DAT 23 by the CPU 22. After the data transfer has been achieved, the CPU 22 transfers a reset I/O bit command to the DAT 23, after the I/O controller 24 or 25 gives notice to the CPU that data transfer is finished.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An information processing system including an address translation system for mapping a plurality of virtual address spaces onto a real address space, comprising:
    main memory means for storing information;
    main memory controller means for accessing said main memory means with a real address, including translator means for translating a virtual address into said real address;
    processing means, connected to said main memory controller means through a common bus, for delivering said virtual address to said main memory means in accessing the main memory means;
    said translator means including;
        address translation storage means for storing a table having a respective real address corresponding to said virtual address;
        translation circuit means, connected to said address translation storage means for accessing said address translation storage means whereby the real address corresponding to said virtual address delivered to said main memory controller means is selected;
        address translation buffer means, connected to said translation circuit means and having a plurality of entries, including an entry for storing a translation pair including the virtual address and the real address corresponding to said virtual address stored in said address translation storage means and selected by said translation circuit means; and
        address translation buffer management means for replacing the address translation pair currently stored in said entry of said address translation buffer means to the new address translation pair corresponding to virtual address space used for the new access of said main memory means when said address translation buffer management means previously searches said address translation buffer means and said new address translation pair is not found in said address translation buffer means.

2. An information processing system according to claim 1, wherein each said entry of said address translation buffer means comprises first control data; and
    said address translation buffer management means determining whether said address translation pair currently stored in any one of said entries can be replaced to the new address translation pair according to said first control data stored in said entry.

3. An information processing system comprising:
    main memory means for storing information;
    main memory controller means for accessing said main memory means with a real address, including translator means for translating a virtual address into said real address;
    processing means, connected to said main memory controller means through a common bus, for delivering a virtual address to said main memory means in accessing the main memory;
    input/output controller means, connected to said main memory controller means and said processing means through said common bus, for interfacing input/output devices with said main memory controller means and said processing means;
    said processing means delivering a command to said input/output control means to transfer information between said main memory means and said input/output devices in a direct memory access operation and then also delivering a virtual address to said input/output controller means upon delivering said command;
    said input/output controller means delivering a virtual address to said main memory controller means through said common bus when said input/output controller means access said main memory means in transferring information between said main memory means and said input/output devices in executing said command delivered by said processing means; and said translator means comprising, address translation buffer management means for replacing the address translation pair currently stored in said entry of said address translation buffer means to a new address translation pair corresponding to virtual address space used for the new access of said main memory means when said address translation buffer management means previously searches said address translation buffer means and said new address translation pair is not found in said address translation buffer means.

4. An information processing system according to claim 3, wherein each said entry of said address translation buffer means has first control data; and said address translation buffer management determining whether said address translation pair currently stored in any one of said entries can be replaced to the new address translation pair according to said first control data stored in said entry.

5. An information processing system according to claim 3, wherein said translator means further includes:

control circuit means for inhibiting that said address translation buffer management means replaces said translation pair stored in the entry used for the memory access by said input/output controller means when said control bit in the entry is set;

said entry of said address translation buffer means having second control data;

said second control data of said entry, which stores said address translation pair corresponding to the virtual address space used for the memory access by said input/output controller means, being set by said processing means before said processing means commands said input/output controller means to transfer information between said main memory means and said input/output device and being reset by said processing means when said information transfer is terminated; and said control circuit means inhibiting said replacement according to said second control data.

* * * * *